US010754412B2

(12) United States Patent
Nakadokoro

(10) Patent No.: US 10,754,412 B2
(45) Date of Patent: Aug. 25, 2020

(54) ELECTRONIC DEVICE AND CONTROLLING METHOD FOR THE SAME

(71) Applicant: CANON KABUSHIKI KAISHA, Tokyo (JP)

(72) Inventor: Masakazu Nakadokoro, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 218 days.

(21) Appl. No.: 15/944,970

(22) Filed: Apr. 4, 2018

(65) Prior Publication Data

US 2018/0292880 A1 Oct. 11, 2018

(30) Foreign Application Priority Data

Apr. 7, 2017 (JP) ................................. 2017-077165

(51) Int. Cl.
| | |
|---|---|
| *G06F 1/3218* | (2019.01) |
| *G06F 1/3296* | (2019.01) |
| *G06F 1/3234* | (2019.01) |
| *G06F 3/147* | (2006.01) |
| *G09G 5/00* | (2006.01) |
| *G06F 1/26* | (2006.01) |

(52) U.S. Cl.
CPC ............ *G06F 1/3218* (2013.01); *G06F 1/266* (2013.01); *G06F 1/3265* (2013.01);
(Continued)

(58) Field of Classification Search
CPC .......... G06F 1/26; G06F 1/266; G06F 1/3203; G06F 1/3206; G06F 1/3215;
(Continued)

(56) References Cited

U.S. PATENT DOCUMENTS

| | | | |
|---|---|---|---|
| 2006/0177192 A1* | 8/2006 | Jonnala | G06F 1/26 385/147 |
| 2014/0250327 A1* | 9/2014 | Flynn | G06F 1/30 714/22 |

(Continued)

FOREIGN PATENT DOCUMENTS

JP    2015-174377 A    10/2015

OTHER PUBLICATIONS

"Universal Serial Bus Power Delivery Specification", Revision 3.0, Version 1.0a. Aug. 2, 2016. Hewlett-Packard Company et al. (Year: 2016).*

(Continued)

*Primary Examiner* — Thomas J. Cleary
(74) *Attorney, Agent, or Firm* — Cowan, Liebowitz & Latman, P.C.

(57) ABSTRACT

The present invention provides an electronic device with added capabilities of preventing power supplying to an external device, and a controlling method for the electronic device. The electronic device includes: a connector capable of being connected to an external device and capable of allowing power supply to the external device; and a controlling unit configured to, in a stage before determining whether the external device has a predetermined functionality, notify the external device with information indicating first power, in a form of information indicating a power capable of being supplied to the external device. The controlling unit is also configured to, after determining that the external device has the predetermined functionality, notify the external device of information indicating second power, which is higher than the first power, in a form of information indicating a power capable of being supplied to the external device.

10 Claims, 9 Drawing Sheets

(52) U.S. Cl.
CPC ............ *G06F 1/3296* (2013.01); *G06F 3/147* (2013.01); *G09G 5/006* (2013.01); *G09G 2330/021* (2013.01); *G09G 2370/10* (2013.01)

(58) Field of Classification Search
CPC ...... G06F 1/3218; G06F 1/325; G06F 1/3253; G06F 1/3265; G06F 1/3278; G06F 1/3296; G06F 3/147; G06F 13/4068; G06F 13/4081; G06F 13/4282; G06F 2213/0042; G09G 5/006; G09G 2330/021; G09G 2370/10
See application file for complete search history.

(56) References Cited

U.S. PATENT DOCUMENTS

| | | | | |
|---|---|---|---|---|
| 2016/0231777 | A1* | 8/2016 | DeCamp | G06F 1/1632 |
| 2018/0024899 | A1* | 1/2018 | Degura | G06F 11/221 |
| | | | | 358/520 |
| 2018/0183340 | A1* | 6/2018 | Waters | H02M 3/157 |
| 2019/0094937 | A1* | 3/2019 | Sultenfuss | G06F 1/28 |

OTHER PUBLICATIONS

"USB Type-C and power delivery 101—Ports and connections". Embedded. Online May 8, 2017. Retrieved from Internet Jan. 3, 2020. <https://www.embedded.com/usb-type-c-and-power-delivery-101-ports-and-connections/>. (Year: 2017).*

"Designing in USB Type-C and Using Power Delivery for Rapid Charging". Digi-Key Electronics. Online Mar. 15, 2017. Retrieved from Internet Jan. 3, 2020. <https://www.digikey.com/en/articles/techzone/2017/mar/designing-in-usb-type-c-and-using-power-delivery-for-rapid-charging>. (Year: 2017).*

* cited by examiner

ELECTRONIC DEVICE AND CONTROLLING METHOD FOR THE SAME

BACKGROUND OF THE INVENTION

Field of the Invention

The present invention relates to an electronic device and a controlling method for the electronic device.

Description of the Related Art

In recent times, there has been proposed a USB Type-C connector, a small connector capable of being used on both of a host side and a device side and capable of being inserted in a reverse direction. The specifications relating to the USB Type-C are specified in the USB 3.1 specification. In the USB 3.1 specification, Alternate Mode is specified as an optional functionality. With the alternate mode, video data or other types of data conforming to DisplayPort (DP) specifications, HDMI® (High-Definition Multimedia Interface) specifications, or other specifications can be transferred to a display or the like. In addition, the USB 3.1 specifications also specify various specifications such as USB Type-C Power Delivery (PD) specifications and USB Battery Charging specifications. Japanese Patent Application Laid-Open No. 2015-174377 discusses an image forming apparatus performing a negotiation with a device being a power supplying destination when entering into a sleeping state.

With conventional techniques, there are cases where an electronic device performs unintended power supplying to an external device.

SUMMARY OF THE INVENTION

An objective of the present invention is to provide an electronic device capable of preventing power supplying to an external device, and a controlling method for the electronic device.

According to one aspect of an embodiment, there is provided an electronic device including: a connector capable of being connected to an external device and capable of allowing power supply to the external device; and a controlling unit configured to, in a stage before determining whether the external device has a predetermined functionality, notify the external device of information indicating first power in a form of information indicating a power capable of being supplied to the external device, and configured to, after determining that the external device has the predetermined functionality, notify the external device of information indicating second power higher than the first power in a form of information indicating a power capable of being supplied to the external device.

According to another aspect of the embodiment, there is provided an electronic device including: a connector capable of being connected to an external device and capable of allowing power supply to the external device; and a controlling unit configured to, in a stage before determination as to whether the external device has a predetermined functionality, notify the external device of information indicating first power capable of being supplied to the external device and information indicating second power incapable of being supplied to the external device, in a form of information indicating powers capable of being supplied to the external device, and configured to, when the external device selects the second power, refuse to perform power supply to the external device without determining whether the external device has the predetermined functionality.

According to the present invention, an electronic device capable of preventing power supplying to an external device, and a controlling method for the electronic device can be provided.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
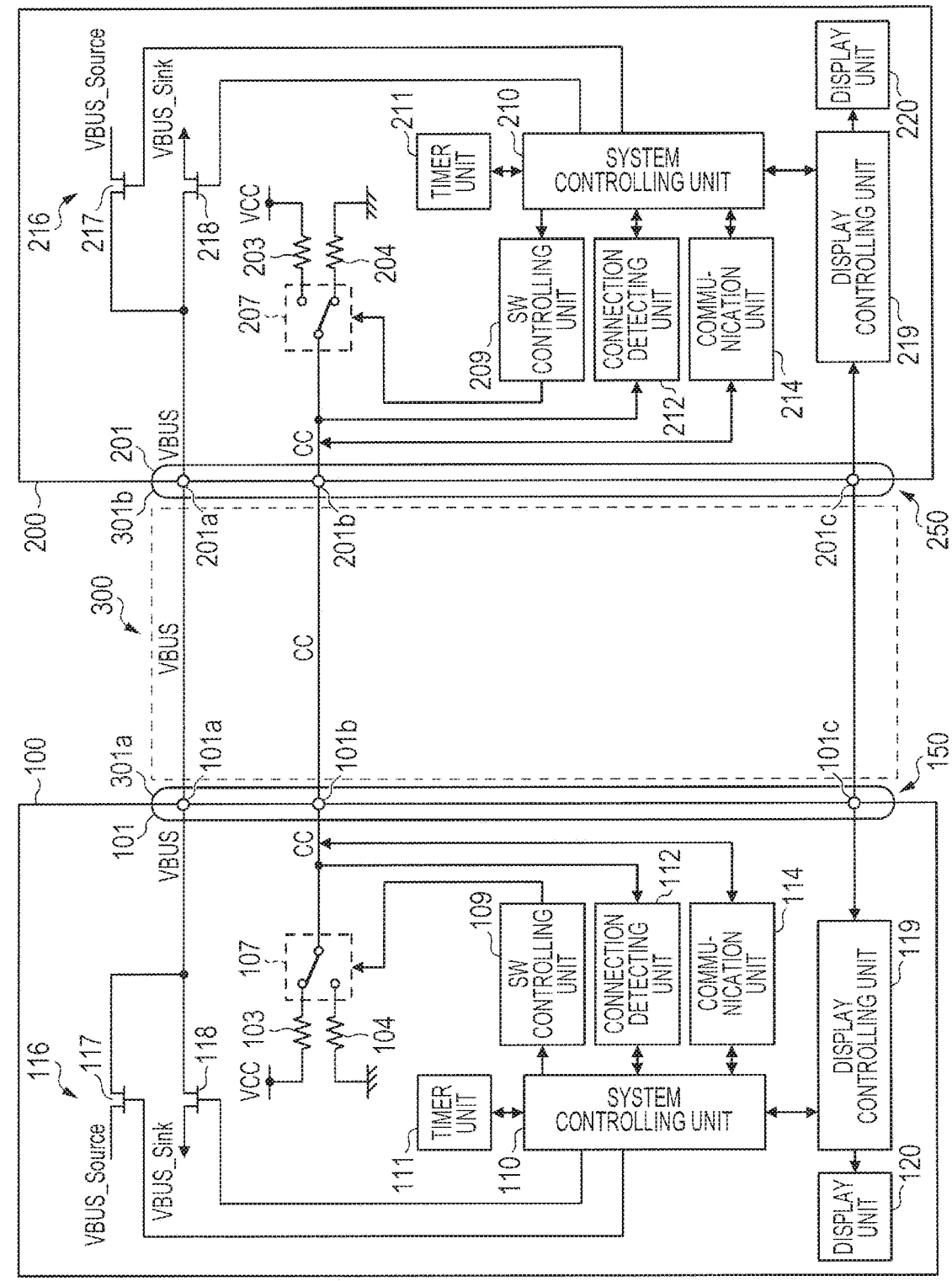
FIG. 1 is a block diagram illustrating an example of an electronic device, an external device, and a cable according to a first embodiment.
Figure 2:
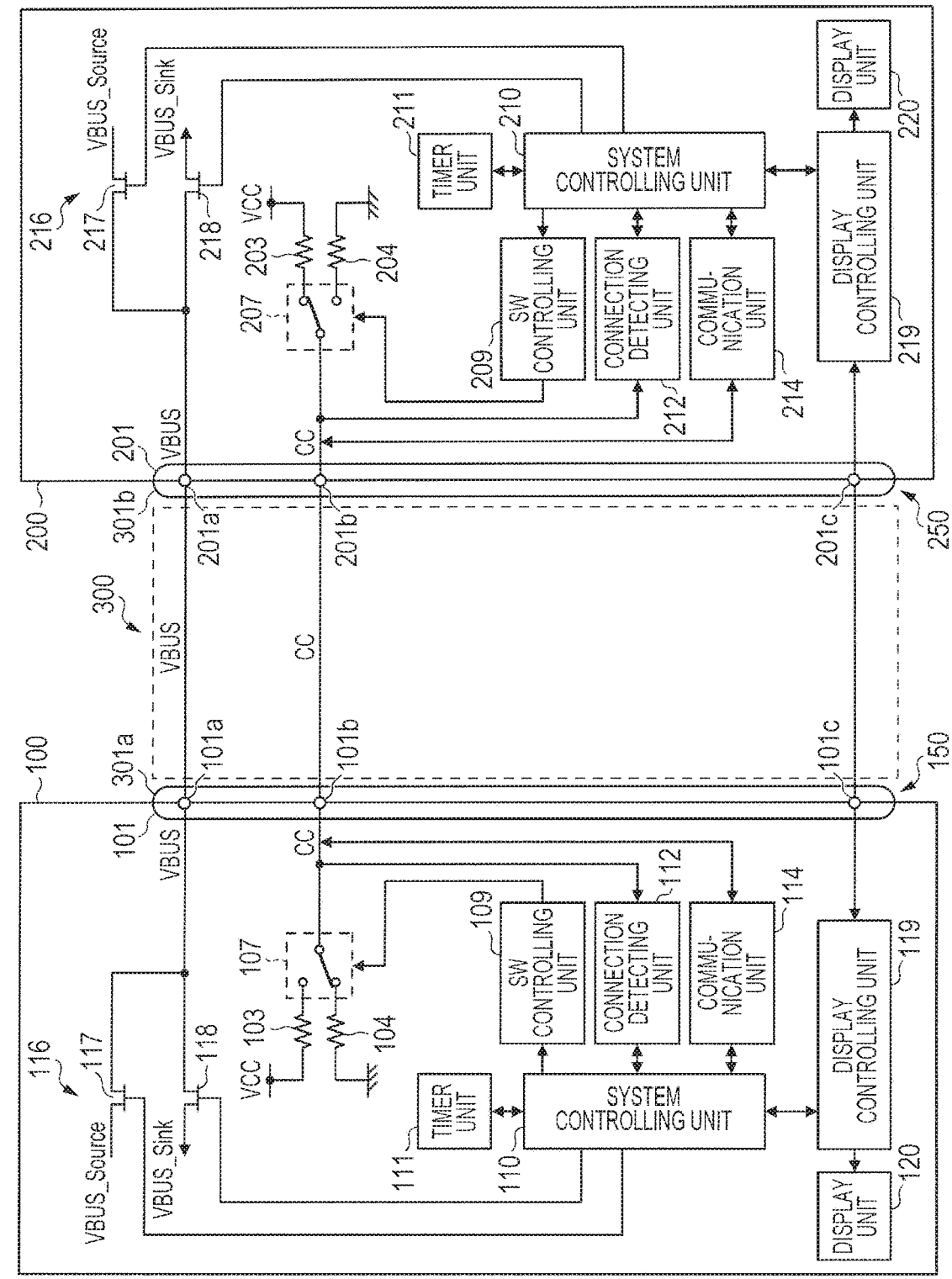
FIG. 2 is a block diagram illustrating an example of the electronic device, the external device, and the cable according to the first embodiment.

Description will be made about an electronic device and a controlling method for the electronic device according to a first embodiment with reference to the drawings. FIG. 1 and FIG. 2 are block diagrams each illustrate an example of the electronic device, an external device, and a cable according to the present embodiment. FIG. 1 and FIG. 2 illustrate a case where an electronic device 100 is a device including a Dual Role Port (DRP), that is, a DRP device. The DRP refers to a Type-C port that can serve as a Downstream Facing Port (DFP) and an Upstream Facing Port (UFP), and can switch between these roles. The DFP refers to a port on a side that functions as a host by default and supplies power, that is, a Type-C port that serves as a Source by default. The UFP refers to a port that functions as a device and receives power by default, that is, a Type-C port that serves as a Sink by default. An electronic device including the DRP, namely a DRP device, can serve as a DFP device, a device on a side for supplying power to an external device, as well as a UFP device, a device on a side for receiving power from an external device. To determine the roles of the devices, a Configuration Channel (CC) terminal 101b is used. FIG. 1 illustrates a situation where the CC terminal 101b of the electronic device 100 is connected to a pull-up resistor 103, and a CC terminal 201b of the external device 200 is connected to a pull-down resistor 204. FIG. 2 illustrates a situation where the CC terminal 101*b* of the electronic device 100 is connected to a pull-down resistor 104, and a CC terminal 201*b* of the external device 200 is connected to a pull-up resistor 203. The electronic device 100 is assumed to be, for example, an image pickup device that operates on power supplied from a battery (not illustrated) included in the electronic device 100. The electronic device 100 can transmit a video signal to the external device 200 through a TX terminal, which will be described later. The external device 200 is assumed to be a display (display device) that displays an image based on a video signal received from the electronic device 100 or other devices. Note that the electronic device 100 and the external device 200 are not limited to such devices.

The electronic device 100 includes a port 150 conforming to the USB Type-C specifications. The port 150 of the electronic device 100 includes a connector 101. The external device 200 includes a port 250 conforming to the USB Type-C specifications. The port 250 of the external device 200 includes a connector 201. Both of the connectors 101 and 201 are receptacles. The cable 300 has one end including a connector 301*a* conforming to the USB Type-C specifications, and the other end including a connector 301*b* conforming to the USB Type-C specifications. Both of the connectors 301*a* and 301*b* are plugs. The port 150 of the electronic device 100 and the port 250 of the external device 200 are connected to each other through the cable 300. Between the port 150 of the electronic device 100 and the port 250 of the external device 200, communication and power supply can be performed.

As described above, the electronic device 100 is a device including the DRP, which is a Type-C port capable of serving as either the DFP or the UFP and capable of switching between these roles, namely the DRP device. The external device 200 is also a DRP device. The electronic device 100 may be a device operating on the power supplied from the battery (not illustrated). In such a case, the port 150 of the electronic device 100 can serve as a Source to supply the power, and the port 250 of the external device 200 can serve as a Sink to receive the power. Then, the following situation occurs. That is, the residual power of the battery (not illustrated) installed in the electronic device 100, that is, a residual battery quantity is gradually reduced. When the residual battery quantity is reduced, the electronic device 100 may fail to operate properly. The electronic device 100 therefore can be configured not to perform power supplying to the external device 200 unless the power supplying is necessary, from the viewpoint of preventing the reduction in the residual battery quantity of the electronic device 100.

Figure 3:
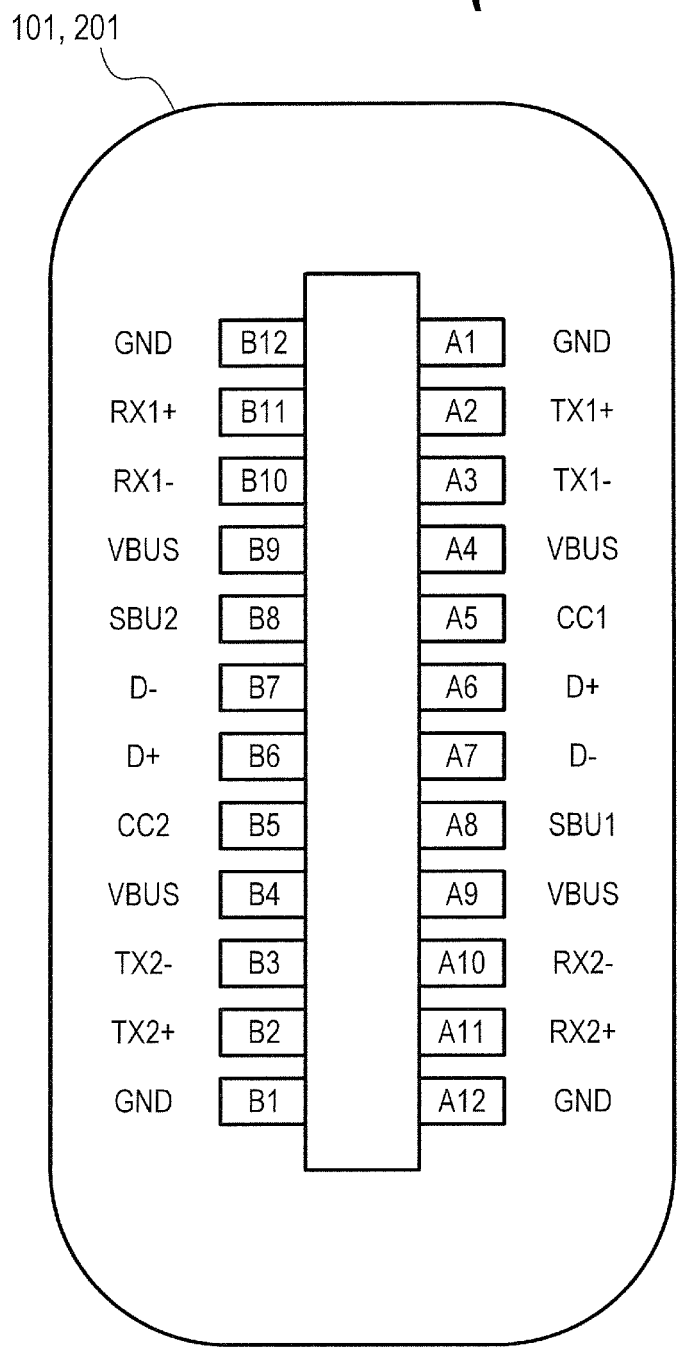
FIG. 3 is a diagram illustrating the pinout of a USB Type-C connector.

FIG. 3 is a diagram illustrating the pinout of a USB Type-C connector, that is, the pinout of the connectors 101 and 201. The USB Type-C connector has a point-symmetry pinout such that the connector can operate properly even when being inserted reversely. The connector 101 includes the CC terminal (CC1, CC2) 101*b* (see FIG. 1), that is, a predetermined terminal. That is, the port 150 of the electronic device 100 includes the CC terminal 101*b*. The connector 201 includes the CC terminal (CC1, CC2) 201*b* (see FIG. 1). That is, the port 250 of the external device 200 includes the CC terminal 201*b*. As described above, the electronic device including the DRP can serve as the DFP device, a device on a side for supplying power to an external device, as well as the UFP device, a device on a side for receiving power from an external device. To determine the roles of the devices, the CC terminals 101*b* and 201*b* are used. The CC terminal 101*b* and the CC terminal 201*b* are electrically connected to each other through the cable 300.

A potential Vs of the CC terminal 101*b* is monitored with a connection detecting unit 112. A potential of the CC terminal 201*b* is monitored with a connection detecting unit 212, which will be described later.

The connector 101 includes a VBUS terminal (power source terminal) 101*a* and a GND terminal (ground terminal). The connector 201 includes a VBUS terminal 201*a* and a GND terminal. From one device to the other device, a predetermined voltage, namely a VBUS, can be supplied through the VBUS terminals 101*a* and 201*a*. TX terminals (TX1+, TX1−, TX2+, TX2−) are terminals for signal transmission, RX terminals (RX1+, RX1−, RX2+, RX2−) are terminals for signal reception, and the TX terminals and the RX terminals can support high-speed data transmission. SBU terminals (SBU1, SBU2) are sideband signal terminals, which can be used for various applications as appropriate. A D+ terminal and a D− terminal are used to support the USB 2.0. The cable 300 includes electric wires corresponding to the terminals illustrated in FIG. 3.

When the electronic device 100 serves as the DFP device, that is, a side for supplying power by default, the electronic device 100 applies a predetermined voltage, namely the VBUS, to the VBUS terminal 101*a* included in the connector 101. The voltage of the VBUS is, for example, 5 V. After establishing a connection, the electronic device 100 and the external device 200 can perform a power role swap (PR SWAP) to exchange the roles of the Source and the Sink. Until the power role swap is performed, however, the electronic device 100 has to supply the power to the external device 200. The electronic device 100 therefore can be configured not to perform power supplying to the external device 200 unless the power supplying is necessary, from the viewpoint of preventing the reduction in the residual battery quantity of the electronic device 100.

As illustrated in FIG. 1, the electronic device 100 includes the connector 101, the pull-up resistor 103, the pull-down resistor 104, a switch 107, a switch controlling unit 109, the connection detecting unit 112, and a system controlling unit 110. The electronic device 100 further includes a timer unit 111, a communication unit 114, and a power source unit 116.

The pull-up resistor 103 has one end connected to a power source line. The power source line is connected to a constant voltage power supply of a predetermined voltage to have a potential of VCC. The pull-up resistor 103 has the other end connected to the switch 107. The pull-up resistor 103 is connectable to the CC terminal 101*b* through the switch 107. The resistance value of the pull-up resistor 103 is specified by the USB Type-C specifications, 22 kΩ for example. The voltage value of VCC is specified by the USB Type-C specifications, 5 V for example. VCC is generated separately from the voltage supplied to the external device 200 through the VBUS terminal 101*a*, namely VBUS.

The pull-down resistor 104 has one end connected to a ground line. The potential of the ground line is a ground potential GND, namely 0 V. The pull-down resistor 104 has the other end connected to the switch 107. The pull-down resistor 104 is connectable to the predetermined terminal, namely the CC terminal 101*b*, through the switch 107. The resistance value of the pull-down resistor 104 is specified by the USB Type-C specifications, 5.1 kΩ for example.

The switch 107 is for switching between connections. In some state, the switch 107 connects the CC terminal 101*b* and the pull-up resistor 103 (a pull-up state). In another state, the switch 107 connects the CC terminal 101*b* and the pull-down resistor 104 (a pull-down state). In still another state, the switch 107 connects the CC terminal 101*b* to neither the pull-up resistor 103 nor the pull-down resistor 104 (an open state). The switch 107 is controlled by the switch controlling unit 109.

The switch controlling unit (SW controlling unit) 109 controls the switch 107 under instructions from the system controlling unit 110. The switch controlling unit 109 can control the switch 107 such that the CC terminal 101b is connected to the pull-up resistor 103. Connecting the CC terminal 101b to the pull-up resistor 103 can indicate to the external device 200 that the electronic device 100 serves as a host, namely the DFP device. The switch controlling unit 109 can control the switch 107 such that the CC terminal 101b is connected to the pull-down resistor 104. Connecting the CC terminal 101b to the pull-down resistor 104 can indicate to the external device 200 that the electronic device 100 serves as a device, namely the UFP device. The switch controlling unit 109 can switch the switch 107 periodically. The periodic switching of the switch 107 can indicate to the external device 200 that the electronic device 100 is the DRP device, which can serve as a host and a device. The switch controlling unit 109 can set the switch 107 to the open state. That is, the switch controlling unit 109 can bring the CC terminal 101b into a state where the CC terminal 101b is connected to neither the pull-up resistor 103 nor the pull-down resistor 104. The switch controlling unit 109 performs control such that the pull-up resistor 103 and the pull-down resistor 104 are alternately connected to the CC terminal 101b until connection detecting unit 112 determines the electronic device 100 and the external device 200 connected to each other through the cable 300. Periodically alternating connection of the pull-up resistor 103 and the pull-down resistor 104 to the CC terminal 101b is referred to as Toggling.

The communication unit 114 performs communication conforming to the USB Type-C Power Delivery (PD) specification, namely PD communication, with the CC terminal 101b.

A display unit 120 displays a still image or a movie (video) based on image data output from a display controlling unit 119. As the display unit 120, for example, a small liquid crystal panel is used. The display unit 120 is provided such that, for example, a display screen is exposed outside a main body of the electronic device 100.

The connection detecting unit (connection detecting circuit) 112 determines whether the electronic device 100 and the external device 200 are connected to each other through the cable 300. The connection detecting unit 112 outputs the result of the determination as to whether the electronic device 100 and the external device 200 are connected to each other through the cable 300, to the system controlling unit 110. That is, when the electronic device 100 and the external device 200 are connected to each other through the cable 300, the connection detecting unit 112 outputs information indicating that the electronic device 100 and the external device 200 are connected to each other through the cable 300, to the system controlling unit 110. The connection detecting unit 112 determines the electronic device 100 and the external device 200 to be connected to each other through the cable 300 when the potential Vs of the CC terminal 101b falls within a predetermined range expressed by the following Formula (1). A voltage Vmin is, for example, 0.2 V, and a voltage Vmax is, for example, 2.04 V. The voltages Vmin and Vmax are specified by, for example, the USB Type-C specifications.

$$V\text{min} \leq Vs < V\text{max} \quad (1)$$

The voltage Vmax, the upper limit of the predetermined range expressed by Formula (1), is lower than the potential of the power source line connected to the pull-up resistor 103, namely VCC. The voltage Vmin, the lower limit of the predetermined range expressed by Formula (1), is higher than the potential of the ground line connected to the pull-down resistor 104, namely GND.

For example, when the CC terminal 101b is connected to the pull-up resistor 103 through the switch 107, and the electronic device 100 and the external device 200 are not connected to each other through the cable 300, the potential Vs of the CC terminal 101b is VCC. VCC is a potential out of the predetermined range expressed by Formula (1). In this case, the connection detecting unit 112 does not determine the electronic device 100 and the external device 200 to be connected to each other through the cable 300. When the CC terminal 101b is connected to the pull-down resistor 104 through the switch 107, and the electronic device 100 and the external device 200 are not connected to each other through the cable 300, the potential Vs of the CC terminal 101b is GND (0 V). GND is a potential out of the predetermined range expressed by Formula (1). In this case, the connection detecting unit 112 does not determine the electronic device 100 and the external device 200 to be connected to each other through the cable 300. In this manner, when the electronic device 100 and the external device 200 are not connected to each other through the cable 300, the connection detecting unit 112 does not determine the electronic device 100 and the external device 200 to be connected to each other through the cable 300.

Also in a case where the CC terminal 101b and the CC terminal 201b are electrically connected, when the CC terminal 101b is connected to the pull-up resistor 103, and the CC terminal 201b is connected to the pull-up resistor 203, the potential Vs of the CC terminal 101b is VCC. VCC is a potential out of the predetermined range expressed by Formula (1). In this case, the connection detecting unit 112 does not determine the electronic device 100 and the external device 200 to be connected to each other through the cable 300. Also in a case where the CC terminal 101b and the CC terminal 201b are electrically connected, when the CC terminal 101b is connected to the pull-down resistor 104, and the CC terminal 201b is connected to the pull-down resistor 204, the potential Vs of the CC terminal 101b is the ground potential GND. The ground potential GND is a potential out of the predetermined range expressed by Formula (1). In this case, the connection detecting unit 112 does not determine the electronic device 100 and the external device 200 to be connected to each other through the cable 300. In this manner, also in a case where the electronic device 100 and the external device 200 are connected to each other through the cable 300, when both of the CC terminals 101b and 201b are connected to the pull-up resistors 103 and 203, respectively, the potential Vs of the CC terminal 101b is VCC. In this manner, also in a case where the electronic device 100 and the external device 200 are connected to each other through the cable 300, when both of the CC terminals 101b and 201b are connected to the pull-down resistors 104 and 204, respectively, the potential Vs of the CC terminal 101b is GND. In this case, the connection detecting unit 112 therefore does not determine the electronic device 100 and the external device 200 to be connected to each other through the cable 300, either.

As illustrated in FIG. 1, the CC terminal 101b is connected to the pull-up resistor 103, the CC terminal 201b is connected to the pull-down resistor 204, and the CC terminal 101b and the CC terminal 201b are connected to each other through the cable 300. In such a case, the following situation occurs. That is, the potential Vs of the CC terminal 101b is a potential within the predetermined range expressed by Formula (1). In such a case, the connection detecting unit 112 determines the electronic device 100 and the external device 200 to be connected to each other through the cable 300.

As illustrated in FIG. 2, the CC terminal 101b is connected to the pull-down resistor 104, the CC terminal 201b is connected to the pull-up resistor 203, and the CC terminal 101b and the CC terminal 201b are connected to each other through the cable 300. In such a case, the following situation occurs. That is, the potential Vs of the CC terminal 101b is a potential within the predetermined range expressed by Formula (1). In such a case, the connection detecting unit 112 determines the electronic device 100 and the external device 200 to be connected to each other through the cable 300.

When the connection detecting unit 112 determines the electronic device 100 and the external device 200 to be connected through the cable 300, the system controlling unit 110 controls the switch controlling unit 109 to end the toggling. After the toggling is ended, the CC terminal 101b is connected to one of the pull-up resistor 103 and the pull-down resistor 104, which is selected by the switch controlling unit 109 as a resistance to be connected to the CC terminal 101b.

When the pull-up resistor 103 is selected by the switch controlling unit 109 as the resistance to be connected to the CC terminal 101b, the electronic device 100 is connected to the external device 200, serving as a DFP device. That is, in such a case, the port 150 of the electronic device 100 serves as a Source, and the port 250 of the external device 200 serves as a Sink. With the pull-up resistor 103 connected to the CC terminal 101b, establishing the connection between the electronic device 100 and the external device 200 brings the electronic device 100 into a connection state where the electronic device 100 can supply power to the external device 200 through the port 150.

On the other hand, when the pull-down resistor 104 is selected by the switch controlling unit 109 as the resistance to be connected to the CC terminal 101b, the electronic device 100 is connected, as a UFP device, to the external device 200. That is, in such a case, the port 150 of the electronic device 100 serves as a Sink, and the port 250 of the external device 200 serves as a Source. With the pull-down resistor 104 connected to the CC terminal 101b, establishing the connection between the electronic device 100 and the external device 200 brings the electronic device 100 into a connection state where the electronic device 100 can receive power from the external device 200 through the port 150.

The system controlling unit (controlling unit) 110 is responsible for controlling the entire electronic device 100. The system controlling unit 110 controls functional blocks included in the electronic device 100, namely the switch controlling unit 109, the timer unit 111, the connection detecting unit 112, the communication unit 114, the power source unit 116, the display controlling unit 119, and the like. For the system controlling unit 110, use is made of, for example, a central processing unit (CPU). The system controlling unit 110 acquires information output from the functional blocks included in the electronic device 100 and outputs signals to control the operations of the functional block. The system controlling unit 110 outputs, to the switch controlling unit 109, information about whether to continue the toggling, based on the result of the determination made by the connection detecting unit 112 as to whether the electronic device 100 and the external device 200 is connected to each other through the cable 300. In a case where the connection detecting unit 112 determines the electronic device 100 and the external device 200 to be connected to each other through the cable 300, the system controlling unit 110 controls the switch controlling unit 109 to end the toggling. As a result, the resistance to be connected to the CC terminal 101b is fixed. After the electronic device 100 and the external device 200 is connected to each other through the cable 300, the system controlling unit 110 acquires information indicating the resistance connected to the CC terminal 101b, from the switch controlling unit 109, and based on the acquired information, determines the following determination. That is, the system controlling unit 110 determines whether the electronic device 100 is connected to the external device 200 as a DFP device or connected to the external device 200 as a UFP device.

The potential of the CC terminal 101b may fall within the predetermined range the CC terminal 101b connected to the pull-up resistor 103. In such a case, the system controlling unit 110 performs the following process before the determination as to whether the external device 200 has a predetermined function. The system controlling unit 110 notifies the external device 200 of information indicating first power, in a form of information indicating power capable of being supplied to the external device 200. The first power is lower than a power necessary to be received by the external device 200. The first power is, for example, 0 W. After the determination that the external device 200 has the predetermined function, The system controlling unit 110 notifies the external device 200 of information indicating second power higher than the first power, in a form of information indicating power capable of being supplied to the external device 200. After notifying the external device 200 of the information indicating first power, if the system controlling unit 110 receives no response from the external device 200, the system controlling unit 110 notifies the external device 200 of information indicating third power, which is higher than the first power, as information indicating power capable of being supplied to the external device 200. The predetermined functionality is, for example, a functionality of performing communication to predetermined specifications.

The timer unit 111 measures a time such as a timing for switching the switch 107. Information indicating the time measured by the timer unit 111 is provided to the system controlling unit 110.

At the time of displaying a video on the display unit 120, the display controlling unit 119 controls the display unit 120 and transmits video data to the display unit 120. At the time of using the alternate mode to cause the external device 200 to perform the displaying, the display controlling unit 119 transmits the video data to the external device 200 through, for example, a TX terminal 101c of the connector 101 and an RX terminal 201c of the connector 201.

The power source unit (power controlling unit) 116 is provided with a voltage converting unit (not illustrated). The voltage converting unit uses, for example, power supplied from a battery (not illustrated) to generate predetermined voltages, namely, VCC and VBUS. The power source unit 116 controls power supply to an electronic circuit and driving components provided in the electronic device 100. In addition, the power source unit 116 can charge the battery with power received from the external device 200. VBUS_Source indicates VBUS supplied from the electronic device 100 to the external device 200, VBUS being supplied to the external device 200 through a switch 117 and the VBUS terminal 101a. VBUS_Sink indicates VBUS supplied from the external device 200 to the electronic device 100, VBUS being supplied to the battery and other components included in the electronic device 100. When the port 150 of the electronic device 100 is to serve as a Source, the system controlling unit 110 brings the switch 117 into an on-state and brings a switch 118 into an off-state. VBUS is thereby supplied from the electronic device 100 to the external device 200 through the VBUS terminal 101a. When the port 150 of the electronic device 100 is to serve as a Sink, the system controlling unit 110 brings the switch 117 into an off-state and brings the switch 118 into an on-state. VBUS from the external device 200 is thereby supplied to the electronic device 100 through the VBUS terminal 101a.

As with the electronic device 100, the external device 200 is a device including a DRP port, namely the DRP device. The external device 200 includes the connector 201, the pull-up resistor 203, the pull-down resistor 204, a switch 207, a switch controlling unit 209, a system controlling unit 210, the connection detecting unit 212, a timer unit 211, and a communication unit 214. The external device 200 further includes a power source unit 216, a display controlling unit 219, and a display unit 220. The power source unit 216 includes switches 217 and 218. The functional blocks of the external device 200 are the same as the functional blocks of the electronic device 100 having the same names and will not be described.

Given that the connection between the electronic device 100 and the external device 200 is established with the CC terminal 101b of the electronic device 100 connected to the pull-up resistor 103 and the CC terminal 201b of the external device 200 connected to the pull-down resistor 204, the following situation occurs. That is, the electronic device 100 is supposed to serve as a DFP device, and the external device 200 is supposed to serve as a UFP device. On the other hand, given that the connection between the electronic device 100 and the external device 200 is established with the CC terminal 101b of the electronic device 100 connected to the pull-down resistor 104 and the CC terminal 201b of the external device 200 connected to the pull-up resistor 203, the following situation occurs. That is, the electronic device 100 is supposed to serve as a UFP device, and the external device 200 is supposed to serve as a DFP device.

Figure 4:
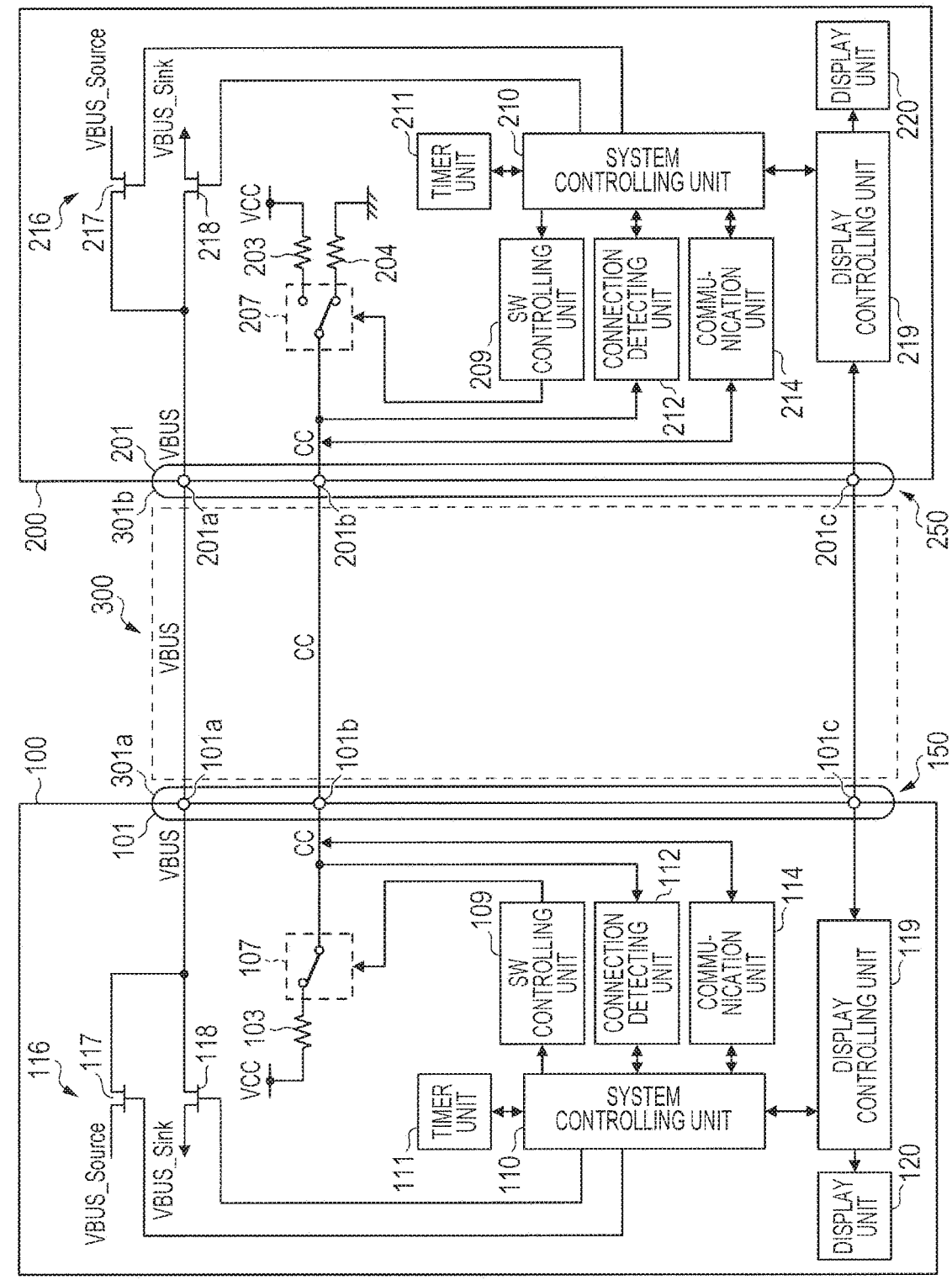
FIG. 4 is a block diagram illustrating another example of an electronic device, an external device, and a cable according to a first embodiment.

FIG. 4 is a block diagram illustrating another example of the electronic device, the external device, and the cable according to the present embodiment. FIG. 4 illustrates a case where the electronic device 100 according to the present embodiment is not an electronic device including a DRP, which is a Type-C port capable of serving either a DFP or a UFP, that is, a case where the electronic device 100 is not a DRP device. FIG. 4 illustrates a case where the electronic device 100 according to the present embodiment is an electronic device including a DFP, namely a DFP device. As illustrated in FIG. 4, the CC terminal 101b is fixedly connected to the pull-up resistor 103. When the electronic device 100 is a DFP device, toggling is not performed in the electronic device 100. Meanwhile, the external device 200 is a DRP device. In such a case, the connection between the electronic device 100 and the external device 200 is established while the potential Vs of the CC terminals 101b and 201b becomes a potential within the predetermined range expressed by the Formula (1), with the CC terminal 201b of the external device 200 connected to the pull-down resistor 204. The external device 200 is connected, as a UFP device, to the electronic device 100.

The PD specification specifies supplied powers up to 100 W. In a case of supplying a power equal to or higher than a certain level, a power profile containing a plurality of power supplying conditions each indicating a power capable of being supplied is notified from a device on a power supplying side to a device on a power receiving side. The device on the power receiving side, that is, a device to be supplied with power, selects a desired power supply condition from the power profile notified from the device on the power supplying side, and transmits a signal (request) indicating the selected power supply condition to the device on the power supplying side. Through such negotiations for power delivery (PD negotiation), power supplied from the device of the power supplying side to the device on the power receiving side is determined. A power supplying condition specifies, for example, a current, that is a maximum supply current, and a voltage.

Figure 5:
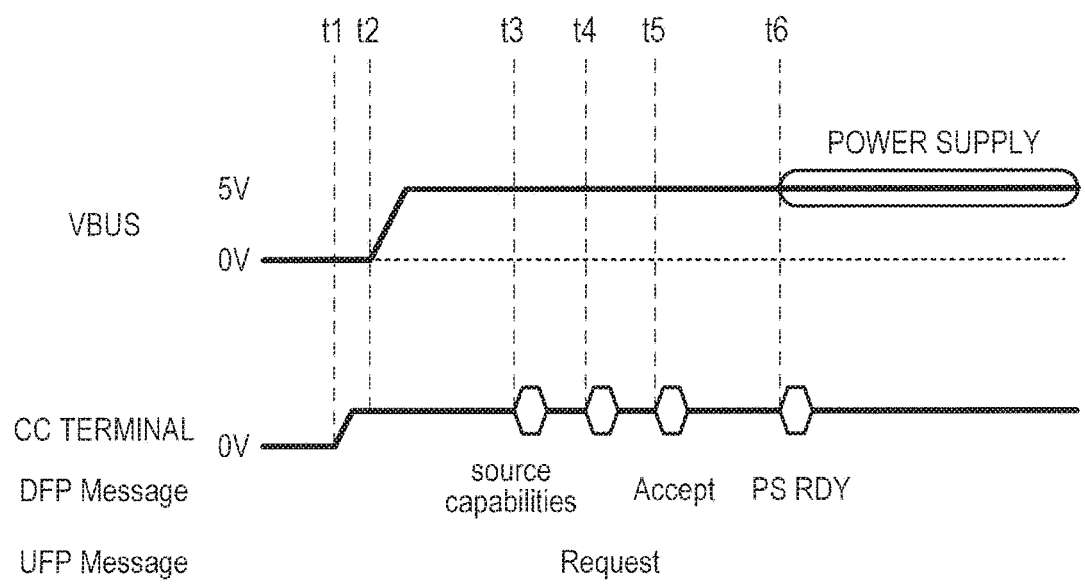
FIG. 5 is a timing diagram illustrating a negotiation for power delivery.

FIG. 5 is a timing diagram illustrating the PD negotiation. At timing t1, devices are connected to each other through a cable, where one of the devices has a CC terminal connected to a pull-up resistor, and the other of the devices has a CC terminal connected to a pull-down resistor. Then, a potential Vs of the CC terminals becomes a potential within the predetermined range expressed by Formula (1). With the potential Vs of the CC terminals being the potential within the predetermined range expressed by Formula (1), at a timing t2, the one supposed to serve as a DFP device outputs VBUS, namely a voltage of 5 V for example, to the other one supposed to serve as a UFP device.

At timing t3, the one supposed to serve as a DFP device notifies the other one supposed to serve a UFP device of Source Capabilities information. The Source Capabilities information contains a power profile.

At timing t4, the UFP device selects a desired power supplying condition from the power profile notified from the DFP device at the timing t3 and transmits a signal indicating the selected power supplying condition to the DFP device. In such a manner, a Request of a power intended to be supplied is made from the UFP device to the DFP device.

At timing t5, when the DFP device is capable of supplying the UFP device with the power requested by the UFP device, the DFP device transmits a message indicating that the DFP device will accept the request from the UFP device, namely an Accept message, to the UFP device. That is, when a power within a range of power supply capabilities is requested by the UFP device, the DFP device accepts the request from the UFP device. Then, the DFP device starts preparations for power supply to the UFP device.

At timing t6, upon completing the preparations for the power supply, the DFP device transmits a PS RDY signal indicating that the DFP device has completed the preparations for the power supply, to the UFP device, and at the same time sets the power to be supplied to the UFP device. The UFP device receives the PS RDY signal and then starts receiving the power supplied from the DFP device. That is, the power supply from the DFP device to the UFP device is started with a supply power adjusted through the PD negotiation between the DFP device and the UFP device.

The DFP device is required to continue to supply the UFP device with the power accepted in the PD negotiation. To change the power supplied from the DFP device to the UFP device, another PD negotiation is needed.

In addition, to perform communication in the alternate mode between the DFP device and the UFP device, a negotiation for entering the alternate mode is performed after a PD negotiation is performed.

Figure 6:
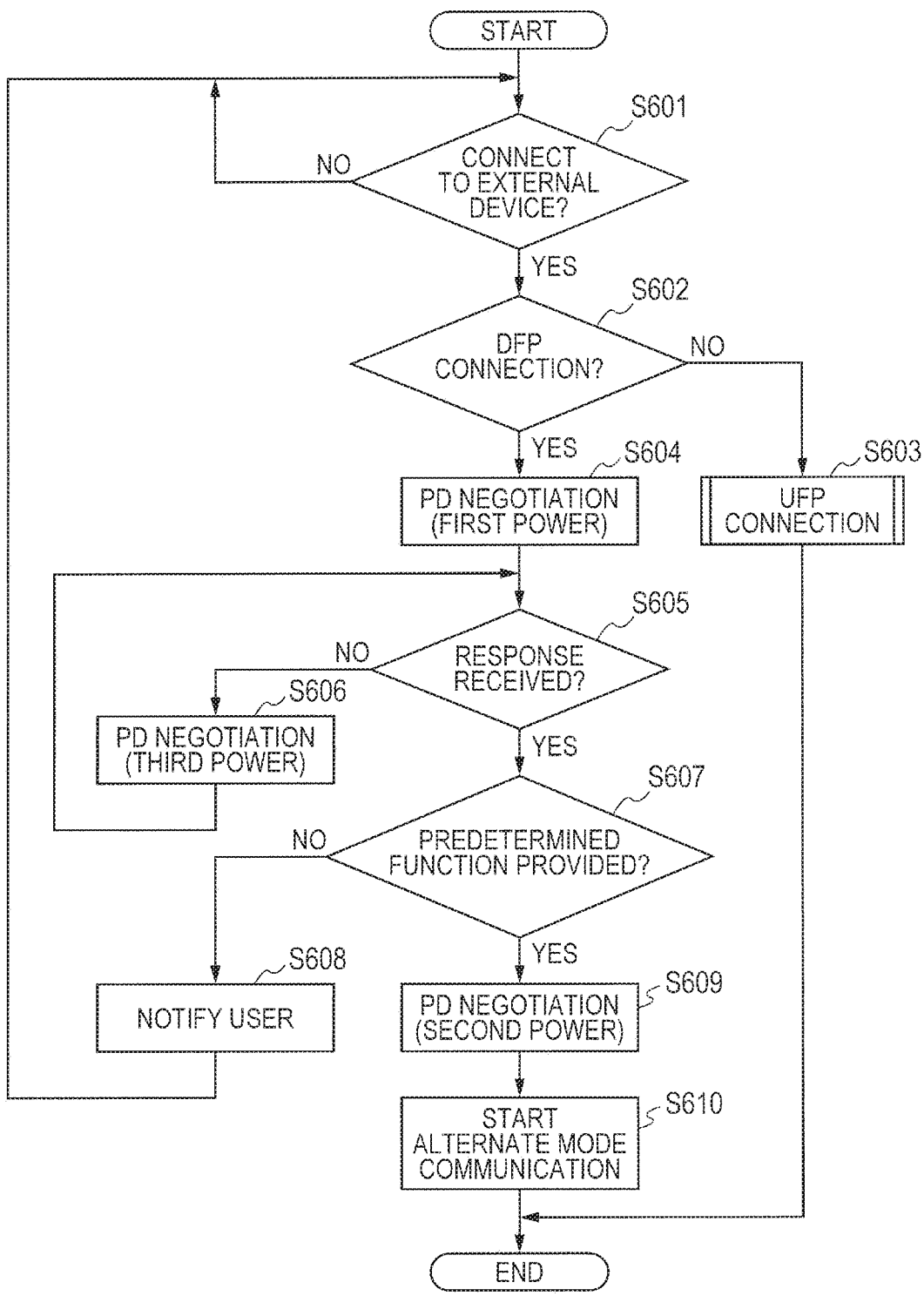
FIG. 6 is a flowchart illustrating the operation of the electronic device according to the first embodiment.

FIG. 6 is a flowchart illustrating the operation of the electronic device according to the present embodiment. Description will be made here about an exemplary case where the electronic device 100 is such a DRP device as illustrated in FIG. 1 or FIG. 2, but the electronic device 100 is not limited to the DRP device. The electronic device 100 may be, for example, such a DFP device as illustrated in FIG. 4.

In step S601, the system controlling unit 110 included in the electronic device 100 determines whether the electronic device 100 is connected to the external device 200. Whether the electronic device 100 is connected to the external device 200 is determined by the determination as to whether the potential Vs of the CC terminal 101b falls within the predetermined range expressed by Formula (1). When the electronic device 100 is connected to the external device 200 (YES in step S601), transition to step S602 is performed. When the electronic device 100 is not connected to the external device 200 (NO in step S601), step S601 is repeated.

In step S602, the system controlling unit 110 determines as to whether or not the electronic device 100 is connected to the external device 200 as a DFP device. It is determined as to whether the electronic device 100 is connected to the external device 200 as a DFP device, based on a determination as to whether the potential Vs of the CC terminal 101b falls within the predetermined range expressed by Formula (1), under a condition that the CC terminal 101b is connected to the pull-up resistor 103. When the system controlling unit 110 determines the electronic device 100 connected to the external device 200 to serve as a DFP device (YES in step S602), step S604 is next performed. When the system controlling unit 110 does not determine the electronic device 100 connected to the external device 200 to serve as a DFP device (NO in step S602), step S603 is next performed. Not determining the electronic device 100 connected to the external device 200 to serve as a DFP device in step S602 means that the electronic device 100 connected to the external device 200 serves as a UFP device. Step S603 includes a connecting process performed in a case where the electronic device 100 connected to the external device 200 serves as a UFP device, which, however, will not be described in detail. Note that description is made here about an exemplary case where the electronic device 100 connected to the external device 200 serves as a UFP device when the electronic device 100 connected to the external device 200 does not serve as a DFP device, but the operation is not limited to this case. For example, the operation may be controlled such that step S601 is repeated when the potential Vs of the CC terminal 101b falls within the predetermined range expressed by Formula (1) with the CC terminal 101b connected to the pull-down resistor 104.

In step S604, the system controlling unit 110 performs a PD negotiation with the system controlling unit 210 of the external device 200. Using the communication unit 114, the system controlling unit 110 transmits Source Capabilities information to the external device 200. As described above, the Source Capabilities information contains a power profile. In step S604, the system controlling unit 110 notifies the external device 200 of a preset power (first power) as the power capable of being supplied. The preset power is such that the power supply is performed from the electronic device 100 to the external device 200 with a power lower than a predetermined power. For example, the system controlling unit 110 notifies the external device 200 of a power supplying condition corresponding to the minimum supply power specified in the USB PD specifications. Such a minimum supply power is assumed to be, for example, 0 W. The external device 200 transmits a request indicating, for example, 0 W, to the electronic device 100. In such a manner, a contract for setting the supply power to 0 W is exchanged between the electronic device 100 and the external device 200. To start the power supply from the electronic device 100 to the external device 200 with the power determined through the PD negotiation in step S604, the voltage of VBUS is controlled. Step S605 is thereafter performed.

In step S605, using the communication unit 114, the system controlling unit 110 transmits a Discover Identity signal to the external device 200. The Discover Identity signal is a signal for looking into what functionality the external device 200 has. When there is no response to the Discover Identity signal from the external device 200 (NO in step S605), step S606 is next performed. When there is a response to the Discover Identity signal from the external device 200 (YES in step S605), step S607 is next performed. The response from the external device 200 is a response to the Discover Identity signal transmitted by the system controlling unit 110 using the communication unit 114. Specifically, the response is information indicating a functionality supported by the external device 200.

In step S606, the system controlling unit 110 performs a PD negotiation with the system controlling unit 210 of the external device 200. When there is no response from the external device 200 in step S605, there is a risk that the external device 200 is not sufficiently supplied with a power necessary to perform communication between the electronic device 100 and the external device 200 in the alternate mode. In step S606, therefore, the system controlling unit 110 notifies the external device 200 of a power supplying condition indicating a supply power (third power) that enables the communication in the alternate mode to be performed between the electronic device 100 and the external device 200. Using the communication unit 114, the system controlling unit 110 transmits the Source Capabilities information to the external device 200. Step S605 is thereafter performed again.

In step S607, the system controlling unit 110 determines whether the external device 200 has the predetermined functionality. The system controlling unit 110 determines whether the external device 200 supports the alternate mode. When the external device 200 supports the alternate mode, the system controlling unit 110 further transmits a Discover SVIDs (Standard or Vendor ID) signal, using the communication unit 114. The Discover SVIDs signal is a signal for checking what kind of the alternate mode is supported by the external device 200. The external device 200 responds to the Discover SVIDs signal. Based on information as the response to the Discover SVIDs signal, from the external device 200, the system controlling unit 110 determines what kind of the alternate mode is supported by the external device 200. When the external device 200 supports, for example, DisplayPort, the system controlling unit 110 can recognize that the external device 200 supports the DisplayPort based on the information as the response from the external device 200. That is, in step S607, the system controlling unit 110 may be said to determine whether the external device 200 can perform communication conforming to specifications supported by the electronic device 100, that is, whether the external device 200 has the predetermined functionality.

When the external device 200 has the predetermined functionality (YES in step S607), step S609 is next performed. For example, when the electronic device 100 supports DisplayPort, and the external device 200 also supports DisplayPort, step S609 is next performed. In contrast, when the external device 200 does not support the predetermined functionality (NO in step S607), step S608 is next performed. In such a manner, a negotiation for entering the alternate mode is performed. For example, when the external device 200 does not support DisplayPort, step S608 is next performed. In other words, the predetermined functionality can be said to be a functionality relating to exchanging signals that the electronic device 100 can support, and the system controlling unit 110 can be said to determine whether the external device 200 has the same functionality relating to exchanging signals as the electronic device 100.

In step S608, the system controlling unit 110 determines that the electronic device 100 has been connected to the external device 200 unsupported by the electronic device 100, and notifies a user that the electronic device 100 has been connected to the unsupported external device 200. Such a notification is made with, for example, the display unit 120 included in the electronic device 100. Note that description is made here about an exemplary case where step S608 is to issue such a notification, but step S608 is not limited to this case. Step S608 may be, for example, to perform a power role swap for swapping the roles of the Source and the Sink. Step S601 is thereafter performed again.

In step S609, the system controlling unit 110 performs a PD negotiation with the system controlling unit 210 of the external device 200. The system controlling unit 110 notifies a power supplying condition indicating a power capable of being supplied from the electronic device 100 to the external device 200 (second power). The electronic device 100 notifies a power supplying condition at least higher than the power supplying condition notified to the external device 200 in the PD negotiation in step S604. The electronic device 100 may notify the external device 200 of a plurality of power supplying conditions that the electronic device 100 is capable of supplying, in a form of the Source Capabilities information. From the power profile notified from the electronic device 100, the external device 200 selects a power supplying condition corresponding to a power intended to be received and transmits, to the electronic device 100, a signal indicating the power supplying condition intended to be accepted (Request). In such a manner, a request for a power intended to be received is made from the external device 200 to the electronic device 100. The electronic device 100 starts the power supply based on the power supplying condition requested by the external device 200, to the external device 200. Step S610 is thereafter performed.

In step S610, the system controlling unit 110 starts the communication in the alternate mode. For example, communication in DisplayPort is started. Note that description is made here about an exemplary case where the communication in the alternate mode is the communication in DisplayPort, but the communication in the alternate mode is not limited to this case.

Figure 7:
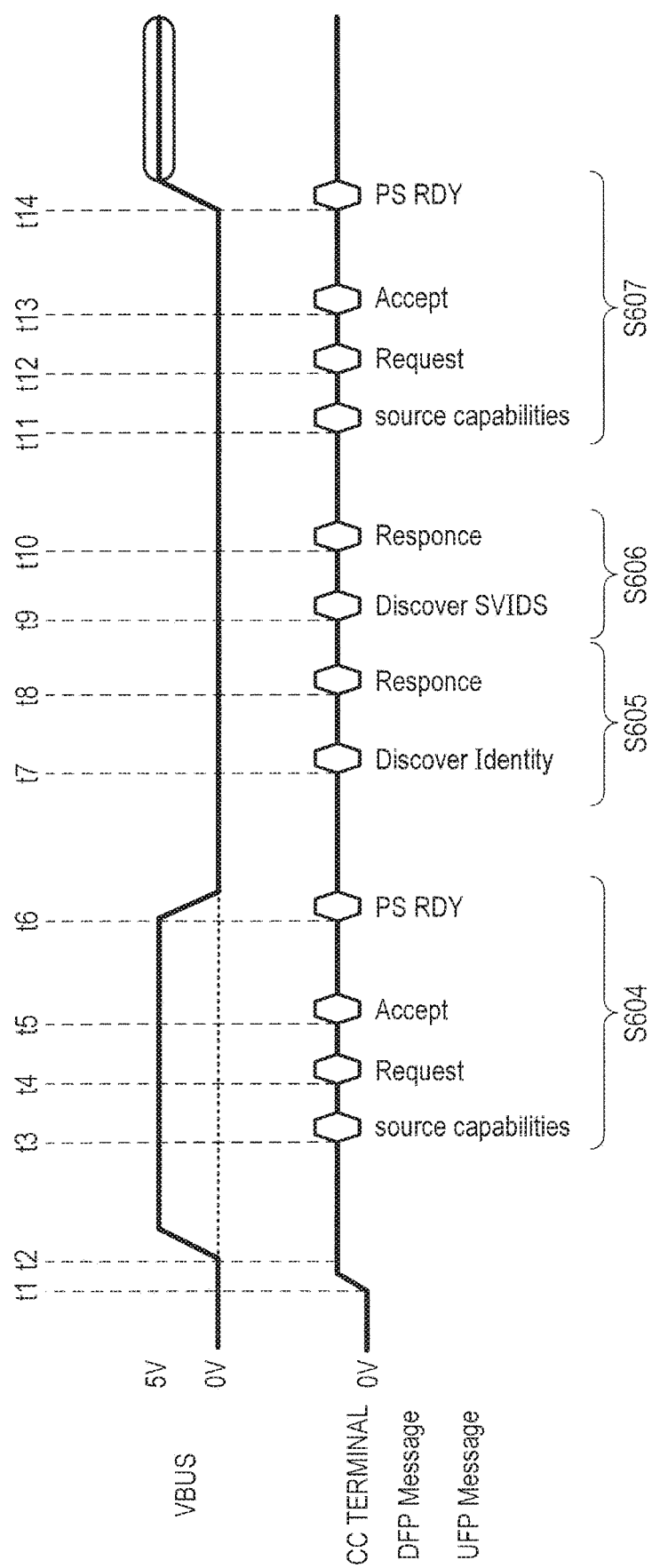
FIG. 7 is a timing diagram illustrating the operation of the electronic device according to the first embodiment.

FIG. 7 is a timing diagram illustrating the operation of the electronic device according to the present embodiment. FIG. 7 illustrates the potential of the VBUS terminal 101a of the electronic device 100, the potential of the CC terminal 101b of the electronic device 100, and messages exchanged between the electronic device 100 (DFP device) and the external device 200 (UFP device). The timing diagram illustrated in FIG. 7 corresponds to a case where the operation illustrated in FIG. 6 is performed. At timing t1, the electronic device 100 and the external device 200 are connected to each other. At timing t2, the potential Vs of the CC terminal 101b is determined to meet a condition expressed by Formula (1), and a process to set the potential of the VBUS terminal 101a to a predetermined potential is started. At timing t3, the PD negotiation in step S604 is started. At timing t3, the system controlling unit 110 is supposed to notify a minimum supply power (0 W). At timings t4, t5, the system controlling unit 110 and the system controlling unit 210 each approve power supplying with the notified power (0 W). At timing t6, power supplying with the minimum supply power (0 W) is started. That is, the potential of the VBUS terminal 101a is controlled to be 0 V.

At timing t7, the system controlling unit 110 transmits a Discover Identity signal to the system controlling unit 210 included in the external device 200, using the communication unit 114. Then, at timing t8, the system controlling unit 110 receives a response to the Discover Identity signal from the system controlling unit 210. At timing t9, the system controlling unit 110 transmits a Discover SVIDs signal to the system controlling unit 210, through the communication unit 114. At timing t10, the system controlling unit 110 receives a response to the Discover SVIDs signal from the system controlling unit 210. It is assumed that the external device 200 is determined to be a device having the predetermined functionality through a series of communications from timing t7 to timing t10.

At timing t11, the system controlling unit 110 starts the PD negotiation again. At timing t11, the system controlling unit 110 notifies the system controlling unit 210 of power supplying conditions containing a power higher than the supply power notified at timing t3 (Source Capabilities). At timing t12, the system controlling unit 210 selects a power supplying condition from the power profile notified from the system controlling unit 110, the power supplying condition corresponding to a power intended to be received, and transmits a Request to the system controlling unit 110. At timing t13, when the system controlling unit 110 is capable of supplying power under the power supplying condition requested in the Request from the system controlling unit 210, the system controlling unit 110 determines to accept the Request. At timing t14, the system controlling unit 110 controls the potential of the VBUS terminal 101a so that the power supply is performed from the electronic device 100 to the external device 200 with the supply power approved during a period from timing t11 to timing t13.

As seen from the above, in the present embodiment, the power supplied from the electronic device 100 to the external device 200 can be limited during the series of processes to determine whether the external device 200 supports the predetermined functionality. In other words, with the present embodiment, the power of the electronic device 100 can be prevented from leaking out to the external device 200.

Figure 8:
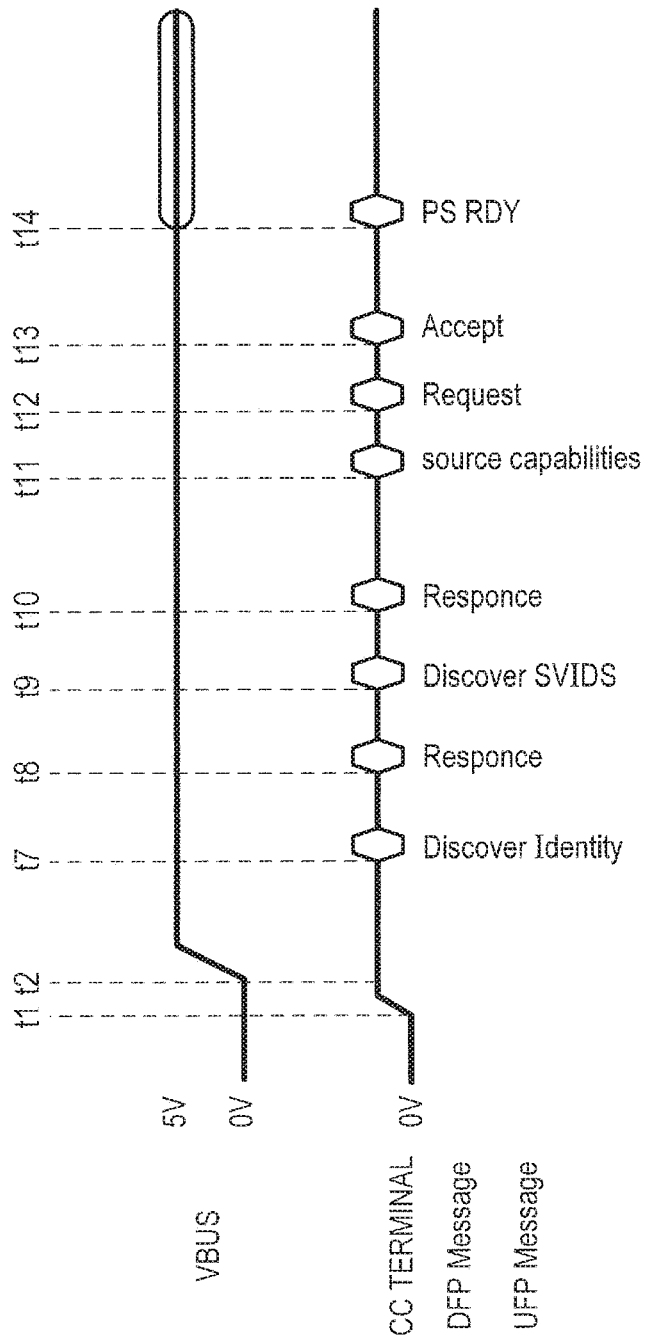
FIG. 8 is a timing diagram illustrating the operation of an electronic device according to a comparative example.

FIG. 8 is a timing diagram illustrating the operation of an electronic device according to a comparative example. The electronic device according to the comparative example performs the PD negotiation after the determination as to whether the external device 200 supports the predetermined functionality. The electronic device according to the comparative example does not perform processes corresponding to the processes to be performed at the timings t3 to t6 out of the processes described above with reference to FIG. 7. In the comparative example, therefore, while the process for determining whether the external device 200 supports the predetermined functionality is performed from the timing t7 to timing t10, the potential of the VBUS terminal 101a is set to a predetermined potential (5 V). As a result, in the comparative example, while the process for determining whether the external device 200 supports the predetermined functionality is performed from the timing t7 to timing t10, power supply is performed from the electronic device 100 to the external device 200.

As seen from the above, with the present embodiment, the power supplying condition corresponding to the minimum supply power specified by the USB PD specifications is notified in the negotiation for the power delivery that is performed in a stage before the negotiation for entering the alternate mode is reached. Such a minimum supply power is, for example, 0 W. As a result, in the stage before the negotiation for entering the alternate mode is reached, the power supplied from the electronic device 100 to the external device 200 can be reduced. The negotiation for entering the alternate mode is then performed, and when the external device 200 is found to be an external device unsupported by the electronic device 100, power supply to the external device 200 is not performed. With the present embodiment, therefore, the power supply to the external device 200 unsupported by the electronic device 100 can be avoided. Consequently, the present embodiment can provide the electronic device capable of restraining the power supplying to the external device.

Second Embodiment

Description will be made about an electronic device and a controlling method for the electronic device according to a second embodiment with reference to the drawings. The same components as those of the electronic device and the controlling method for electronic device according to first embodiment illustrated in FIG. 1 to FIG. 8 are denoted by the same reference characters, and the description thereof will be omitted or made briefly.

An electronic device 100 according to the present embodiment has the same configuration as the configuration of the above-described electronic device 100 in the first embodiment. When the potential of the CC terminal 101b falls within the predetermined range in the state where the CC terminal 101b is connected to the pull-up resistor 103, the system controlling unit 110 performs the following process before the determination as to whether the external device 200 has a predetermined function. Using the CC terminal 101b, the system controlling unit 110 notifies the external device 200 of information indicating first power capable of being supplied to the external device 200 and information indicating second power not capable of being supplied to the external device 200, in a form of information indicating power capable of being supplied to the external device 200. When the external device 200 selects the second power, the system controlling unit 110 refuses to supply the power to the external device 200 without determining whether the external device 200 has the predetermined functionality. When the external device 200 selects the first power, the system controlling unit 110 supplies the power to the external device 200 and at the same time determines whether the external device 200 has the predetermined functionality.

Figure 9:
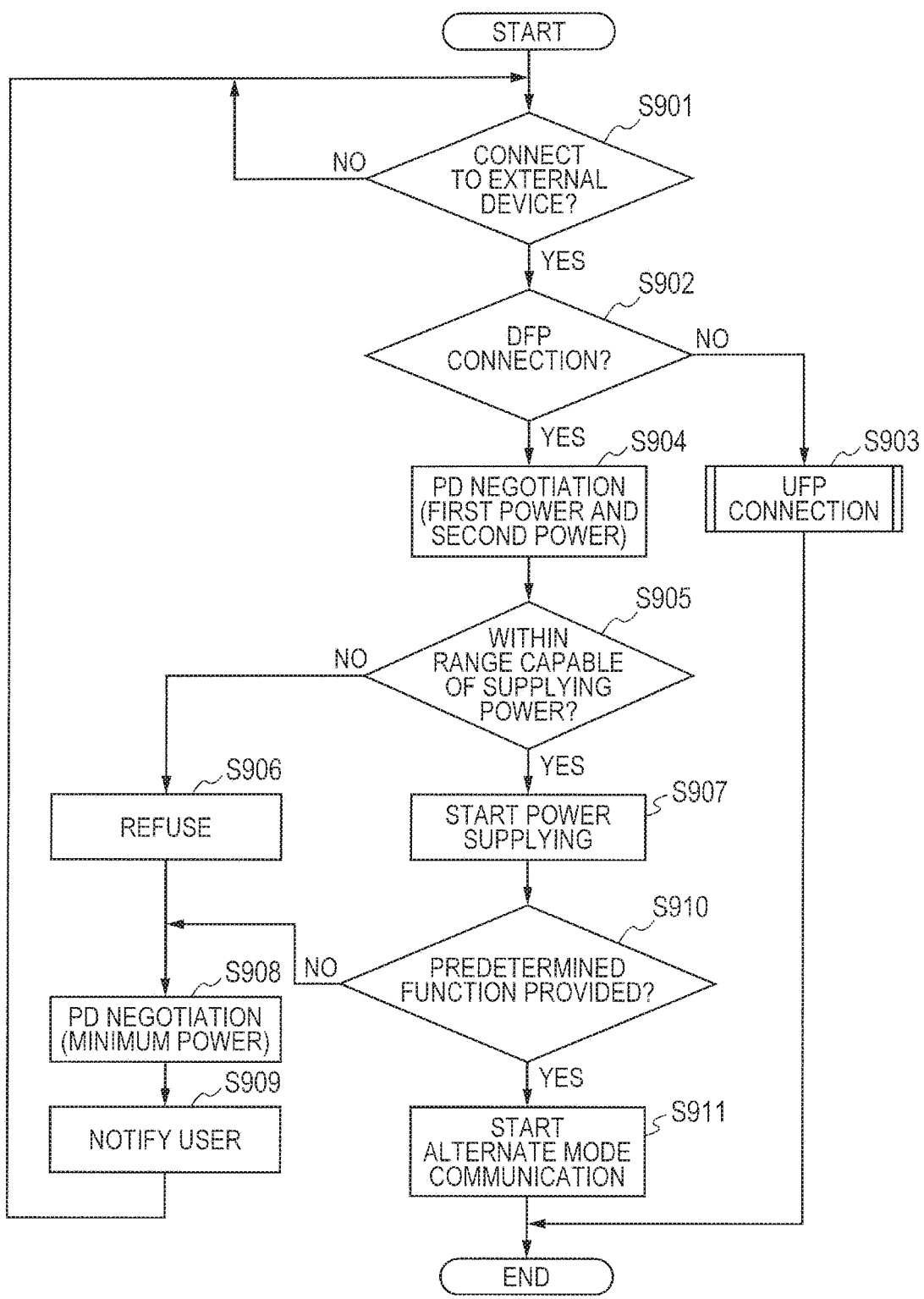
FIG. 9 is a flowchart illustrating the operation of an electronic device according to a second embodiment.

FIG. 9 is a flowchart illustrating the operation of the electronic device according to the present embodiment. Description will be made here about a case where the electronic device 100 is such a DRP device as illustrated in FIG. 1 or FIG. 2, but the electronic device 100 is not limited to the DRP device. The electronic device 100 may be, for example, such a DFP device as illustrated in FIG. 4.

In step S901, the system controlling unit 110 included in the electronic device 100 determines whether the electronic device 100 is connected to the external device 200, as in step S601 described with reference to FIG. 6. When the electronic device 100 is connected to the external device 200 (YES in step S901), step S902 is next performed. When the electronic device 100 is not connected to the external device 200 (NO in step S901), step S901 is repeated.

In step S902, the system controlling unit 110 determines whether the electronic device 100 connected to the external device 200 serves as a DFP device, as in step S602 described with reference to FIG. 6. When the system controlling unit 110 determines the electronic device 100 connected to the external device 200 to serve as a DFP device (YES in step S902), step S904 is next performed. When the system controlling unit 110 does not determine the electronic device 100 connected to the external device 200 to serve as a DFP device (NO in step S902), step S903 is next performed. In step S903, the connecting process for the case where the electronic device 100 connected to the external device 200 serves as a UFP device is performed, as in step S603 described with reference to FIG. 6. Note that description is made here about a case where the electronic device 100 connected to the external device 200 serves as a UFP device when the electronic device 100 connected to the external device 200 does not serve as a DFP device, but the operation is not limited to this case. For example, the operation may controlled such that step S901 is repeated when the potential Vs of the CC terminal 101b falls within the predetermined range expressed by Formula (1) with the CC terminal 101b connected to the pull-down resistor 104.

In step S904, the system controlling unit 110 performs a PD negotiation with the system controlling unit 210 of the external device 200 in the following manner. The system controlling unit 110 first transmits the Source Capabilities information to the external device 200 via the communication unit 114. The electronic device 100 transmits a power supplying condition supported by the electronic device 100 and a power supplying condition unsupported by the electronic device 100, to the external device 200. The power supplying condition supported by the electronic device 100 refers to a power supplying condition indicating a power capable of being supplied from the electronic device 100 to the external device 200 (the first power). For example, a power supplying condition supposed to be supplied from the electronic device 100 to the external device 200 is notified from the electronic device 100 to the external device 200. The power supplying condition unsupported by the electronic device 100 refers to a power supplying condition indicating a power incapable of being supplied from the electronic device 100 to the external device 200 (the second power). That is, power supplying condition unsupported by the electronic device 100 is a power supplying condition exceeding the power supply capability of the electronic device 100 to the external device 200. From the power profile notified by the electronic device 100, the external device 200 selects a power supplying condition corresponding to a power intended to be received and transmits, to the electronic device 100, a signal indicating the selected power supplying condition. In such a manner, the request for the power intended to be supplied is made from the external device 200 to the electronic device 100. Step S905 is thereafter performed.

In step S905, the system controlling unit 110 determines whether the power supplying condition requested by the external device 200 falls within a range supported by the electronic device 100, that is, within a range of power supply capabilities expected by the electronic device 100. When the power supplying condition requested by the external device 200 falls out of the range of power supply capabilities of the electronic device 100 (NO in step S905), step S906 is next performed. In contrast, when the power supplying condition requested by the external device 200 falls within the range of power supply capabilities of the electronic device 100 (YES in step S905), the electronic device 100 transmits an accept message to the external device 200 as a reply, and step S907 is next performed.

In step S906, the system controlling unit 110 refuses the request from the external device 200, and step S908 is next performed.

In step S908, the system controlling unit 110 performs the negotiation for the power delivery again with the external device 200. The system controlling unit 110 notifies the external device 200 of, for example, a power supplying condition corresponding to the minimum supply power specified in the USB PD specifications, in a form of Source Capabilities information. Such a minimum supply power is, for example, 0 W. In such a manner, a contract for setting the supply power to, for example, 0 W is exchanged between the electronic device 100 and the external device 200. Step S909 is thereafter performed.

In step S909, the system controlling unit 110 determines that the electronic device 100 has been connected to the external device 200 unsupported by the electronic device 100, as in step S608 described with reference to FIG. 6. The system controlling unit 110 then notifies a user that the electronic device 100 has been connected to the unsupported external device 200. Note that description is made here about a case where step S909 is to issue such a notification, but step S909 is not limited to this case. Step S909 may be, for example, to perform a power role swap for swapping the roles of the Source and the Sink. Step S901 is thereafter performed again.

In step S907, the electronic device 100 starts the power supply based on the power supplying condition requested by the external device 200, to the external device 200. Step S910 is thereafter performed.

In step S910, the system controlling unit 110 determines whether the external device 200 has the predetermined function in the following manner. First, using the communication unit 114, the system controlling unit 110 transmits a Discover Identity signal to the external device 200. The external device 200 responds to the Discover Identity signal. Based on information as a response from the external device 200, the system controlling unit 110 determines whether the external device 200 supports the alternate mode. When the external device 200 supports the alternate mode, the system controlling unit 110 transmits a Discover SVIDs signal, using the communication unit 114. The external device 200 responds to the Discover SVIDs signal. Based on information as a response from the external device 200, the system controlling unit 110 determines what kind of the alternate mode is supported by the external device 200. When the external device 200 supports, for example, a DisplayPort, the system controlling unit 110 can recognize that the external device 200 supports the DisplayPort based on the information as the response from the external device 200. The system controlling unit 110 determines whether the external device 200 can perform communication conforming to specifications supported by the electronic device 100, that is, whether the external device 200 has the predetermined function. When the external device 200 has the predetermined function (YES in step S910), step S911 is next performed. For example, when the electronic device 100 supports DisplayPort, and the external device 200 also supports DisplayPort, step S911 is next performed. In contrast, when the external device 200 does not support the predetermined function (NO in step S910), step S908 is next performed. In such a manner, a negotiation for entering the alternate mode is performed.

In step S911, the system controlling unit 110 starts the communication in the alternate mode. For example, communication in DisplayPort is started. Note that description is made here about an exemplary case where the communication in the alternate mode is the communication in DisplayPort, but the communication in the alternate mode is not limited to this case.

As seen from the above, in the present embodiment, the electronic device 100 notifies the external device 200 of the power supplying condition supported by the electronic device 100 and the power supplying condition unsupported by the electronic device 100, in a form of the Source Capabilities information. When the external device 200 selects the power supplying condition unsupported by the electronic device 100, the electronic device 100 refuses to supply the power to the external device 200 without entering the negotiation for entering the alternate mode. That is, in the present embodiment, the power unsupported by the electronic device 100 to supply from the electronic device 100 to the external device 200 is avoided in a stage before the negotiation for entering the alternate mode is reached. In such a manner, also with the present embodiment, the power supplying to the external device can be prevented.

Modified Embodiments

The present invention has been described above in detail in relation to preferred embodiments. However, the present invention is not limited to the particular embodiments and should be construed as embracing various other forms without departing from the gist of the invention. Some of the components of the above embodiments may be combined as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^T$), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-077165, filed Apr. 7, 2017, which is hereby incorporated by reference herein in its entirety.

What is claimed is:

1. An electronic device comprising:
a connector capable of being connected to an external device and capable of allowing power supply to the external device; and
a controller configured to perform
1) determining whether the external device connected via the connector enables to perform communication with DisplayPort (DP) specifications,
2) before the determining, notifying, to the external device, information indicating first power,
3) in a case that the determining determines that the external device enables to perform the communication with DisplayPort(DP) specifications, notifying, to the external device, information indicating second power higher than the first power, and
4) in a case that the determining determines that the external device does not enable to perform the communication with DisplayPort(DP) specifications, notifying, to a user, information indicating that the external device does not enable to perform the communication with DisplayPort(DP) specifications.

2. An electronic device according to claim 1, wherein the first power is lower than a power necessary to be received by the external device.

3. An electronic device according to claim 1, wherein the first power is 0 W.

4. An electronic device according to claim 1, wherein when a potential of a predetermined terminal included in the connector falls within a predetermined range with the predetermined terminal connected to a pull-up resistor, the controller notifies the external device of the information indicating first power, using the predetermined terminal.

5. An electronic device according to claim 4, further comprising
a switch capable of connecting the predetermined terminal to one of the pull-up resistor or a pull-down resistor, wherein
the controller is configured to periodically switch the switch.

6. An electronic device according to claim 1, wherein when the controller receives no response from the external device after notifying the external device of the information indicating first power, the controlling unit notifies the external device of information indicating third power higher than the first power in a form of information indicating a power capable of being supplied to the external device.

7. An electronic device according to claim 1, wherein the connector conforms to USB Type-C specifications.

8. An electronic device according to claim 1, wherein the electronic device includes DRP capable of serving as either DFP or UFP and capable of switching between the DFP and the UFP.

9. A controlling method for an electronic device, comprising:
determining whether an external device connected via a connector enables to perform communication with DisplayPort(DP) specifications;
notifying, before the determining, to the external device, information indicating first power;
notifying, in a case that the determining determines that the external device enables to perform the communication with DisplayPort (DP) specifications, to the external device, information indicating second power higher than the first power, and
notifying, to a user, information indicating that the external device does not enable to perform the communication with DisplayPort (DP) specifications, in a case that the determining determines that the external device does not enable to perform the communication with DisplayPort (DP) specifications.

10. A controlling method for an electronic device according to claim 9, wherein
the electronic device includes DRP capable of serving as either DFP or UFP and capable of switching between the DFP and the UFP.

* * * * *